(12) United States Patent
Stein et al.

(10) Patent No.: US 10,154,403 B2
(45) Date of Patent: Dec. 11, 2018

(54) METHOD OF AND SYSTEM FOR PROVIDING A MULTI-IMSI SOLUTION IN AN OPERATING MOBILE NETWORK

(71) Applicants: KNOWROAMING LTD., North York, ON (CA); TELECOM NORTH AMERICA INC, Henderson, NV (US)

(72) Inventors: Mathew Stein, North York (CA); Jean Gottschalk, Henderson, NV (US)

(73) Assignees: KNOWROAMING LTD, Toronto Ontario (CA); TELECOM NORTH AMERICA INC., Henderson, NV (US)

( * ) Notice: Subject to any disclaimer, the term of this patent is extended or adjusted under 35 U.S.C. 154(b) by 0 days.

(21) Appl. No.: 15/036,347

(22) PCT Filed: Nov. 12, 2014

(86) PCT No.: PCT/IB2014/065983
§ 371 (c)(1),
(2) Date: May 12, 2016

(87) PCT Pub. No.: WO2015/071834
PCT Pub. Date: May 21, 2015

(65) Prior Publication Data
US 2016/0286377 A1    Sep. 29, 2016

Related U.S. Application Data

(60) Provisional application No. 61/903,283, filed on Nov. 12, 2013.

(51) Int. Cl.
*H04M 1/66* (2006.01)
*H04W 8/10* (2009.01)
(Continued)

(52) U.S. Cl.
CPC .............. *H04W 8/10* (2013.01); *H04W 4/60* (2018.02); *H04W 8/183* (2013.01); *H04W 8/205* (2013.01); *H04W 12/06* (2013.01); *H04W 84/042* (2013.01)

(58) Field of Classification Search
CPC .. H04W 4/003; H04W 12/04; H04M 15/8038
(Continued)

(56) References Cited

U.S. PATENT DOCUMENTS

2010/0128685 A1*  5/2010  Jiang ................... H04W 8/12
                                                            370/329
2010/0136967 A1   6/2010  Du et al.
(Continued)

FOREIGN PATENT DOCUMENTS

WO   2006/094564 A1   9/2006
WO   2013/002694 A1   1/2013

OTHER PUBLICATIONS

International Search Report (ISR) dated Feb. 23, 2015 for Application No. PCT/8B2014/065983.
(Continued)

*Primary Examiner* — Kiet M Doan
(74) *Attorney, Agent, or Firm* — Ladas & Parry LLP (57) ABSTRACT

According to a first aspect of the invention there is provided a method of providing a multi-IMSI solution for a subscriber having a mobile device in an operating mobile network, the mobile device being fitted with a SIM card having an IMSI and a baseband component, the mobile device comprising a corresponding baseband processor to enable the SIM card to communicate with a home network, run by a home network operator, related to the IMSI via the baseband processor. The method comprises fitting a SIM card overlay to the SIM card, the overlay acting as a proxy between the SIM card and the mobile device's baseband processor, the overlay com-
(Continued)

prising a primary ("pilot") sponsor IMSI that is related to a sponsor network, run by a sponsor network operator, with a temporary activation Ki, determining when the mobile device has roamed out of the home network and into a foreign network having an agreement with a sponsor network associated with the sponsor IMSI.

16 Claims, 6 Drawing Sheets

(51) Int. Cl.
*H04W 4/60* (2018.01)
*H04W 8/18* (2009.01)
*H04W 8/20* (2009.01)
*H04W 12/06* (2009.01)
*H04W 84/04* (2009.01)

(58) Field of Classification Search
USPC ..... 455/419, 411, 432.1, 558, 416; 370/252; 726/9
See application file for complete search history.

(56) References Cited

U.S. PATENT DOCUMENTS

2013/0023235 A1 1/2013 Fan et al.
2015/0105049 A1* 4/2015 Golaup ............... H04L 63/0892
455/411

OTHER PUBLICATIONS

Written Opinion of the International Searching Authority (WO) for Application No. PCT/8B2014/065983.

* cited by examiner

METHOD OF AND SYSTEM FOR PROVIDING A MULTI-IMSI SOLUTION IN AN OPERATING MOBILE NETWORK

RELATED APPLICATION

This application is an application under 35 U.S.C. 371 of International Application No. PCT/IB2014/065983 filed on Nov. 12, 2014, which claims the benefit of U.S. Provisional Application No. 61/903,283 filed on Nov. 12, 2013, the entire contents of each of which are incorporated herein by reference.

FIELD OF THE INVENTION

This invention relates to a method of and system for providing a multi-IMSI solution in an operating mobile network.

BACKGROUND OF THE INVENTION

A subscriber identification module (SIM) is a well know device in the fields of mobile telephony and data communications. A SIM is an integrated circuit, typically embedded into a SIM card, which securely stores network-specific information used to authenticate and identify subscribers on a network, the network typically corresponding to a mobile/cellular telephone network. The most important information stored includes the International Mobile Subscriber Identity (IMSI), which is used to identify a SIM card with respect to its home network, the SIM's unique international circuit card identifier (ICCID) and an authentication key (Ki) used to identify and authenticate subscribers on mobile devices (such as cellular telephones, tablets and mobile computers).

The IMSI number in turn typically comprises one or more of the following:
- a mobile country code (MCC), in terms of which use of the mobile device will be limited to one country;
- a mobile network code (MNC), in terms of which use of the mobile device will be limited to a pre-determined network, such as Orange, for example; and
- a mobile station (i.e. device) identification number (MSIN) in terms of which use of the mobile device will be limited to one SIM card.

Figure 1:
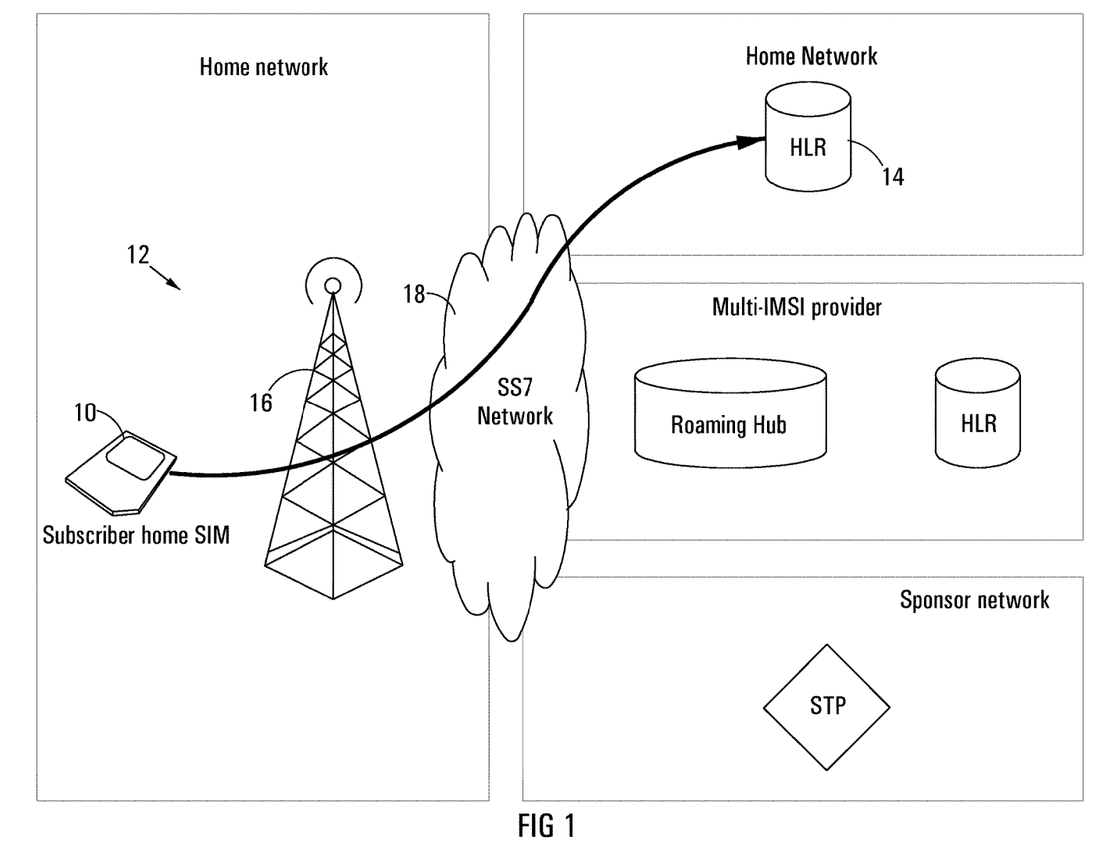
FIG. 1 shows a high level architectural layout and typical signal flow when a subscriber

The IMSI is also used for acquiring other details of the mobile device in a Home Location Register (HLR) or as locally copied in a Visitor Location Register (VLR). The HLR is a central database that contains details of each mobile device subscriber that is authorized to use the GSM core network. Thus, as shown in FIG. 1, when the subscriber home SIM 10 is operating in its home network, it communicates with it related home network HLR 14, via a network station 16 and related network 18.

The VLR is a database of the subscribers who have roamed into the jurisdiction of the MSC (Mobile Switching Center) which it serves. Each base station in the network is served by exactly one VLR, hence a subscriber cannot be present in more than one VLR at a time. The data stored in the VLR has either been received from the HLR, or collected from the mobile device. Whenever a new mobile device is detected in its network, the operator not only creates a new record in its VLR, but it also updates the HLR of the mobile subscriber, informing it of the new location of that mobile device.

The $K_i$ authentication key is a 128-bit value used in authenticating the SIM on a mobile network. Each SIM holds a unique $K_i$ assigned to it by the operator during a personalization process. The $K_i$ is also stored in a database on the network.

The SIM card provides a software function that allows the mobile device to pass data to the SIM card to be signed with the $K_i$. This, by design, makes usage of the SIM card mandatory unless the $K_i$ can be extracted from the SIM card.

Before describing the typical authentication process, to enable a mobile device to connect to a network, the mobile device, at a high level, comprises a baseband processor to manage the antenna-related functions of the mobile device and a SIM card, with the baseband processor communicating with the network. The SIM card in turn comprises a baseband only component that can communicate with the network via the baseband processor. The SIM card further comprises a memory component. The mobile device further comprises an application layer to run software required to operate the mobile device.

With this in mind, the authentication process comprises the following steps:
1. When the mobile device starts up, the application layer requests a connection from the baseband processor.
2. The baseband processor then requests the mobile device's International Mobile Equipment Identity (IMEI) number, which uniquely identifies the mobile device, from the SIM card, as well as the IMSI, which then gets sent as part of a connection/authentication request to the network. The mobile device may have to pass a PIN to the SIM card before the SIM card will reveal this information.
3. The network searches its database for the incoming IMSI and its associated $K_i$.
4. The network then generates a Random Number (RAND) based on the predefined and from this it generates an authentication vector 1 (AV1).
5. The network then sends the RAND to the mobile device 1. The mobile device 1 then uses its predefined $K_i$ (which should match the $K_i$ used by the network operator) and the RAND to generate an authentication vector 2 (AV2). The mobile device then passes the AV2 back to the network.
6. The network then compares AV1 and AV2, and if there is a match, mobile device is granted access to the network.

As briefly touched on above, in order to extend the connectivity service of a mobile device to a location that is different from the home location/network where the service was registered, the mobile device needs to undergo a roaming process. In terms of a conventional roaming process, when the mobile device is turned on or is transferred via a handover to a new or foreign network, this new "visited" network sees the mobile device, notices that it is not registered with its own system, and attempts to identify its home network. The visited network then contacts the home network and requests service information (including whether or not the mobile device should be allowed to roam) about the roaming mobile device using the IMSI number.

If successful, the visited network begins to maintain a temporary subscriber record for the mobile device. Likewise, the home network updates its information to indicate that the mobile device is on the host network so that any information sent to that mobile device can be correctly routed.

In terms of the above, it will be appreciated that the annual revenue of the cellular industry worldwide, with regard to the provision of roaming service, makes roaming very lucrative. In this regard, income generated through roaming charges is incurred by end users making or receiving calls, data or text messages outside of their home network. In some countries networks allow users to roam anywhere in the country and not incur any surcharges for using their mobile devices. In other countries, like Canada, simply leaving the metropolitan area that you reside in can result in roaming charges being incurred. However, in almost all cases leaving the country you reside in will result in excessive roaming charges being incurred.

To address some of the raised in the preceding paragraph, for many years, so-called "dual-IMSI" solutions have been available for mobile operators. These allow subscribers to roam outside of their home network using the roaming agreements of another operator (a so-called sponsor operator). These solutions were initially created to allow startup mobile operators, which did not have any of their own international roaming agreements at launch, to still offer worldwide international roaming coverage to their subscribers, but using the agreements of the sponsor mobile operator.

The dual-IMSI solutions were typically implemented using a SIM card running an application arranged to switch from the home network IMSI to the sponsor's IMSI as soon as the subscriber leaves the home country/network. This switching first occurred manually, by the user selecting a setting in a menu, and later, the solutions were improved to include automatic switching of the IMSI.

In recent years, the focus of these solutions has been less on providing wider roaming coverage, and more on reducing the outbound roaming costs of the home network operator, because the sponsor operator has access to lower outbound roaming rates than the home network operator, either because it handles larger volumes of roaming traffic, or because it benefits from special regulatory frameworks, such as the Eurotariff.

The dual-IMSI solutions typically allow the home network operator to control the behavior and usage of its subscribers from its own home network, regardless of whether the subscriber is roaming using the home IMSI, or the sponsor IMSI. As a consequence, the subscriber also keeps the same MSISDN regardless of which IMSI is being used. This is achieved using elaborate signaling platforms, sometimes called "roaming replicators", which translate signaling in real-time between the sponsor operator's roaming partners, and the operator's home network, so that the home network does not see any difference when the sponsor's IMSI is in use, compared to when the home IMSI is in use. In other words, the home network operator does not need to perform any changes in its network, does not need to install any additional network equipment, and does need any advanced multi-IMSI capable core/home network elements.

There are several problems with the above mentioned solution when it comes to implementation with a new client operator:

1. The traditional dual-IMSI solution requires the sponsor operator to replace the SIM card of every subscriber whom it wants to use the solution with a new SIM card that contains both the home IMSI provided by the home network operator and the additional IMSI provided by the sponsor operator. Since the SIM card is one of the most critical components in a mobile network, operators are very reluctant to deal and handle existing SIM cards, and replacing them would be logistically challenging. Therefore, most mobile networks implement such solutions either from launch, or only for new SIM cards that are being issued to new subscribers.

2. Because the solution is now being used for cost optimization, rather than expanded roaming coverage, it is no longer sufficient to operate with a single sponsor IMSI. Instead, the notion of a multi-IMSI solution has been introduced, whereby multiple IMSIs from multiple sponsor operators are used according to the region where each sponsor operator has the best costs. This requires a more advanced logic on the SIM card as the most cost effective of the multiple sponsor operator IMSIs must be activated depending on the country to which the subscriber is traveling. Because the roaming conditions of a sponsor network changes over time, a static logic in the SIM card is not sufficient, and an advanced logic, which can be controlled by the supplier of the multi-IMSI solution who manages the various sponsor operators, becomes necessary. This requires significant collaboration between the multi-IMSI solution provider, and the SIM card manufacturer, which often means that the multi-IMSI solution provider has developed a complex application tied to a specific SIM manufacturer, which it requires to use to implement the solution. However, the home network operator has no desire to disclose its secret authentication keys (which must be identical between the SIM card and the home network operator's authentication centre in the home network) to a SIM manufacturer whom it may have no experience working with.

Both of the above problems make it very difficult to implement a multi-IMSI solution into an existing mobile network.

The aim of the invention is therefore to provide a method of and system for providing a multi-IMSI solution in an operating mobile network. In particular, the method of the present invention aims to allow the quick and efficient implementation of a multi-IMSI solution in an operating mobile network, without requiring the home network operator to replace SIM cards, communicate secret authentication keys, or install any equipment into its network.

SUMMARY OF THE INVENTION

According to a first aspect of the invention there is provided a method of providing a multi-IMSI solution for a subscriber having a mobile device in an operating mobile network, the mobile device being fitted with a SIM card having an IMSI and a baseband component, the mobile device comprising a corresponding baseband processor to enable the SIM card to communicate with a home network, run by a home network operator, related to the IMSI via the baseband processor, the method comprising:

fitting a SIM card overlay to the SIM card, the overlay acting as a proxy between the SIM card and the mobile device's baseband processor, the overlay comprising a primary ("pilot") sponsor IMSI that is related to a sponsor network, run by a sponsor network operator, with a temporary activation Ki;

determining when the mobile device has roamed out of the home network and into a foreign network having an agreement with a sponsor network associated with the sponsor IMSI;

generating signaling messages, with the sponsor IMSI generating these messages, and sending these to a multi-IMSI roaming hub platform, the roaming hub platform being connected to each sponsor network;

translating these messages in real time and relaying them to the home network of the home network operator, so that to the home network it looks as if the IMSI of the home network operator is still roaming in the home network.

In an embodiment, the overlay may comprise at least secondary sponsor IMSI.

In an embodiment, the method comprises an activation process, which takes place when the overlay is first installed onto the SIM card, and the mobile device is powered up, the activation process comprising:
  presenting the primary sponsor IMSI to an available mobile network with which the sponsor network operator has an established roaming agreement in place;
  in response to an authentication request from the available mobile network, using the temporary activation Ki stored on the overlay; and
  forwarding an authentication request, which now includes the temporary activation Ki, to the sponsor network, for onward transmission to the multi-IMSI roaming hub platform.

In an embodiment, the step of presenting the primary sponsor IMSI to an available mobile network comprises the step of the overlay presenting the primary sponsor IMSI to the baseband processor of the mobile device, which in turn can then present the primary sponsor IMSI to an available mobile network.

In an embodiment, the roaming hub recognizes that the overlay is in an activation process, and forwards the received authentication request to an HLR associated with the multi-IMSI roaming hub platform.

In an embodiment, the HLR associated with the multi-IMSI roaming hub platform knows the temporary activation Ki assigned to the subscriber, with the method further comprising generating authentication data and routing the authentication data back to the sponsor network.

In an embodiment, the activation process comprises reading the IMSI on the underlying SIM card, and originating a command towards the multi-IMSI roaming hub platform to report this IMSI.

In an embodiment, the multi-IMSI roaming hub platform then pairs the primary sponsor IMSI with the IMSI on the underlying original SIM card.

In an embodiment, the method comprises a running process, depending on whether the mobile device is in its home country/network or in a foreign country/network.

When in its home country/network, the overlay acts transparently, and thus simply exposes the IMSI contained on the SIM to the mobile device.

When the mobile device leaves its home country/network, the overlay automatically takes over, and the primary sponsor IMSI is exposed to the mobile device instead of the original IMSI. The primary IMSI communicates with both the multi-IMSI roaming hub platform and core nodes within the home network. Under these circumstances, the running process comprises provisioning additional IMSIs onto the overlay via over the air (OTA), as needed, to ensure that the most economical sponsor IMSI is being used in the country being visited by the mobile device.

According to a second aspect of the invention there is provided a system for providing a multi-IMSI solution for a subscriber having a mobile device in an operating mobile network, the mobile device being fitted with a SIM card having an IMSI and a baseband component, the mobile device comprising a corresponding baseband processor to enable the SIM card to communicate with a home network, run by a home network operator, related to the IMSI via the baseband processor, the system comprising:
  a SIM card overlay that can be fitted to the SIM card, the overlay acting as a proxy between the SIM card and the mobile device's baseband processor, the overlay comprising a primary sponsor IMSI that is each related to a sponsor network, run by a sponsor network operator, with a temporary activation Ki;
  means for determining when the mobile device has roamed out of the home network and into a sponsor network associated with the sponsor IMSI;
  means for generating and sending signaling messages; and
  a multi-IMSI roaming hub platform for receiving the signaling messages, the roaming hub platform being connected to each sponsor network, the multi-IMSI roaming hub platform comprising a processor that is arranged to translate these messages in real time and relaying them to the home network of the home network operator, so that to the home network it looks as if the IMSI of the home network operator is still roaming in the home network.

In an embodiment, the roaming hub platform can recognize when the overlay is in an activation mode, and in this mode the roaming hub platform is arranged to forward a received authentication request to an HLR associated with the multi-IMSI roaming hub platform.

In an embodiment, the HLR associated with the multi-IMSI roaming hub platform, which knows the temporary activation Ki assigned to the subscriber, generates authentication data and routes the authentication data back to the sponsor network.

In an embodiment, in the activation mode, the overlay reads the IMSI on the underlying SIM card, and originating a command towards the multi-IMSI roaming hub platform to report this IMSI.

In an embodiment, the multi-IMSI roaming hub platform is arranged to pair the primary sponsor IMSI with the IMSI on the underlying original SIM card.

In an embodiment, the roaming hub platform can recognize when the overlay is in a running mode, and in this mode, and when the mobile device is in a foreign country/network, the processor of the roaming hub platform is arranged to provision additional IMSIs onto the overlay via over the air (OTA), as needed, to ensure that the most economical sponsor IMSI is being used in the country being visited by the mobile device.

DESCRIPTION OF PREFERRED EMBODIMENTS

In broad terms, this disclosure relates to a method of and system for providing a multi-IMSI solution for a subscriber having a mobile device in an operating mobile network. The mobile device is fitted with a SIM card having an IMSI and a baseband component, as is well known in the art. As is also well know, the mobile device comprises a corresponding baseband processor to enable the SIM card to communicate with a home network 12 (FIGS. 3 and 4), run by a home network operator, related to the IMSI via the baseband processor.

Figure 2:
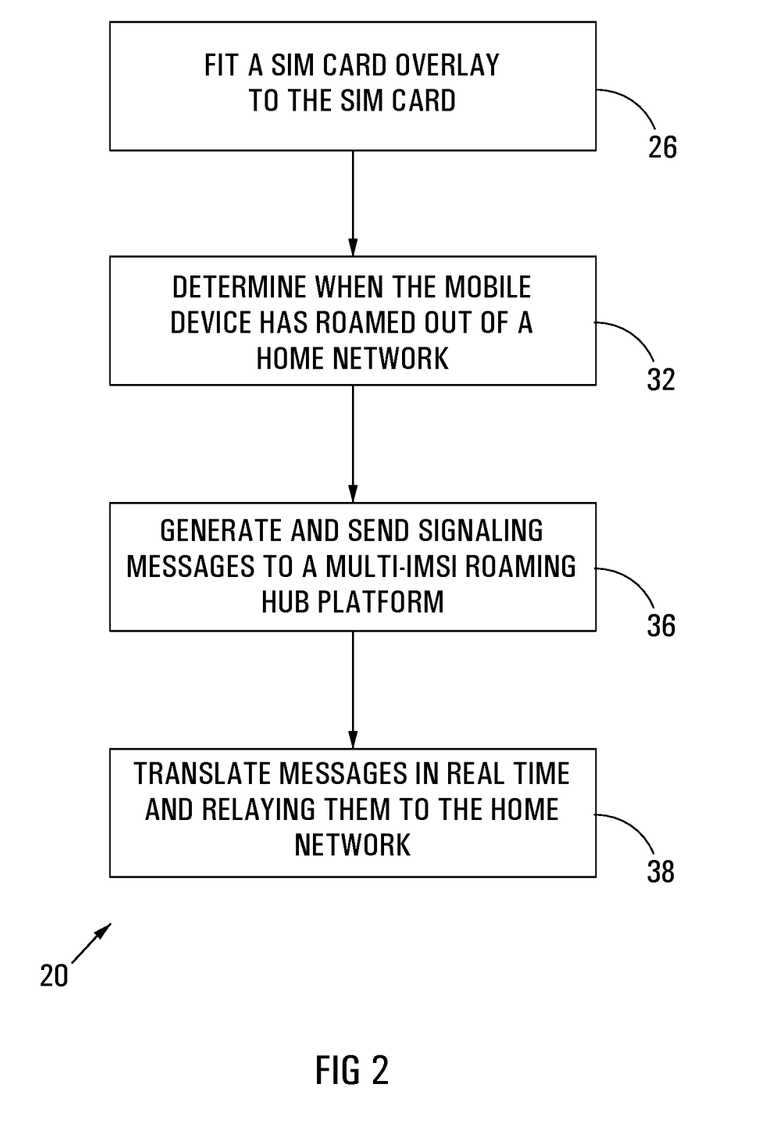
FIG. 2 shows a flow chard representing a method of providing a multi-IMSI solution for a subscriber having a mobile device in an operating mobile network, according to a first embodiment of the present invention.

Turning now to FIG. 2, and with reference to the remaining figures, in an embodiment, a method 20 of the present disclosure comprises fitting a SIM card overlay 22 to a subscriber home SIM card 24, as indicated in block 26.

The SIM card overlay 22 comprises:
1) A communications processor, in which firmware is embedded;
2) A PCB (flexible or otherwise) upon which the MCU is mounted and wires are routed; and
3) Pads that allow for the MCU to send/receive information to/from the mobile device's SIM card 24.

The purpose of the overlay 22 is to intercept communications between the mobile device's baseband processor and the SIM card 24, and to redirect and modify the communications so as to authenticate the mobile device on an alternate communications network. The overlay 22 thus acts as a proxy between the SIM card 24 and the mobile device's baseband processor. In the present disclosure, the overlay 22 comprises a primary ("pilot") sponsor IMSI that is related to a sponsor network 28, run by a sponsor network operator/provider, with a temporary activation Ki. The sponsor network 28 makes of a signal transfer point (STP).

In an embodiment, the overlay may comprise at least secondary sponsor IMSI.

The method 20 further comprises determining when the mobile device has roamed out of the home network 12 and into a foreign network 30 (FIGS. 5 and 6) having an agreement with a sponsor network 28 associated with the sponsor IMSI, as indicated by block 32 in FIG. 2.

The method 20 further comprises generating signaling messages, with the sponsor IMSI generating these messages, and sending these to a multi-IMSI roaming hub platform 34 (FIGS. 3 to 6), the roaming hub platform 34 being connected to each sponsor network 28, as indicated by block 36.

The method 20 further comprises translating these messages in real time and relaying them to the home network 12 of the home network operator, as indicated by block 38, so that to the home network 12 it looks as if the IMSI of the home network operator is still roaming in the home network 12.

The result of the above will be to allow the home network operator to control any behavior and activity from its home network 12, just as it would at home, and the subscriber keeps identical services under the same mobile device number.

Figure 3:
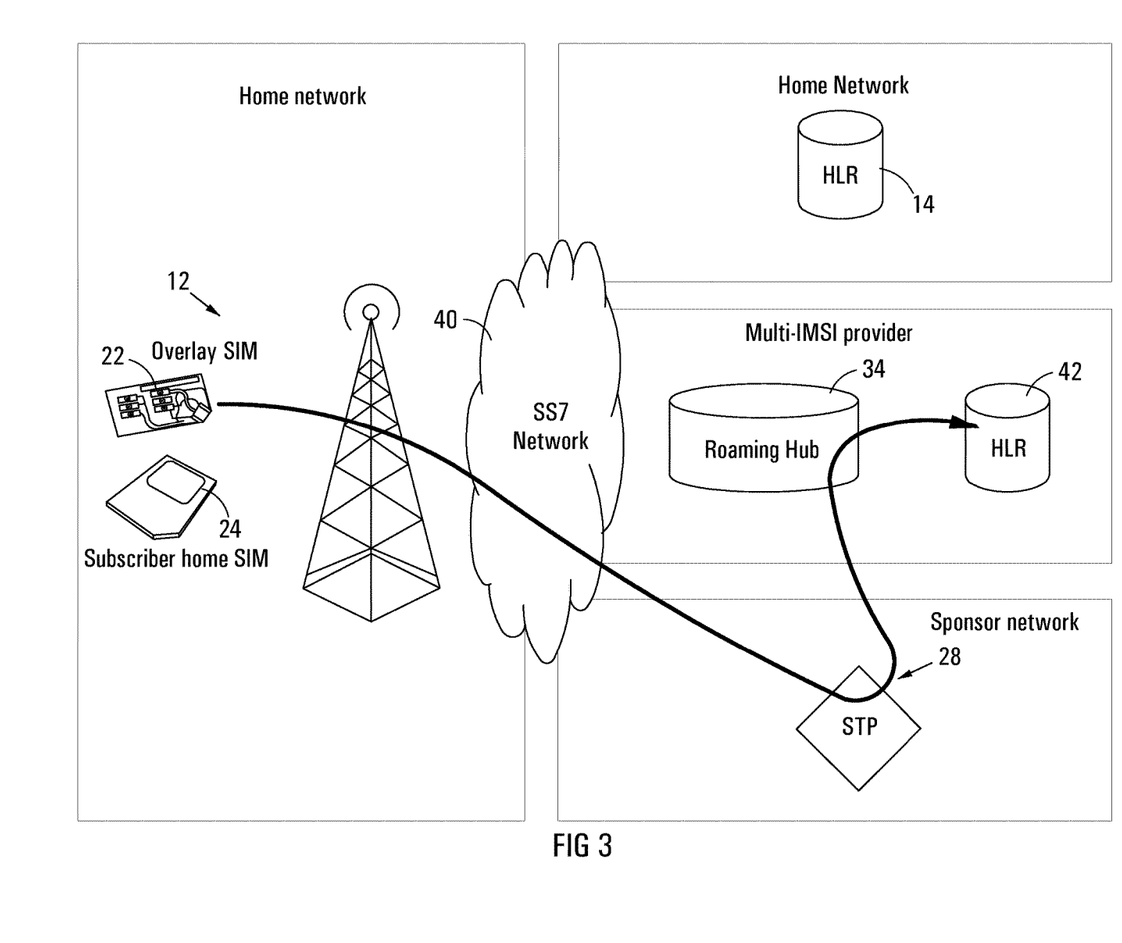
FIG. 3 shows a high level architectural layout and typical signal flow in accordance with a first part of an activation mode.
Figure 4:
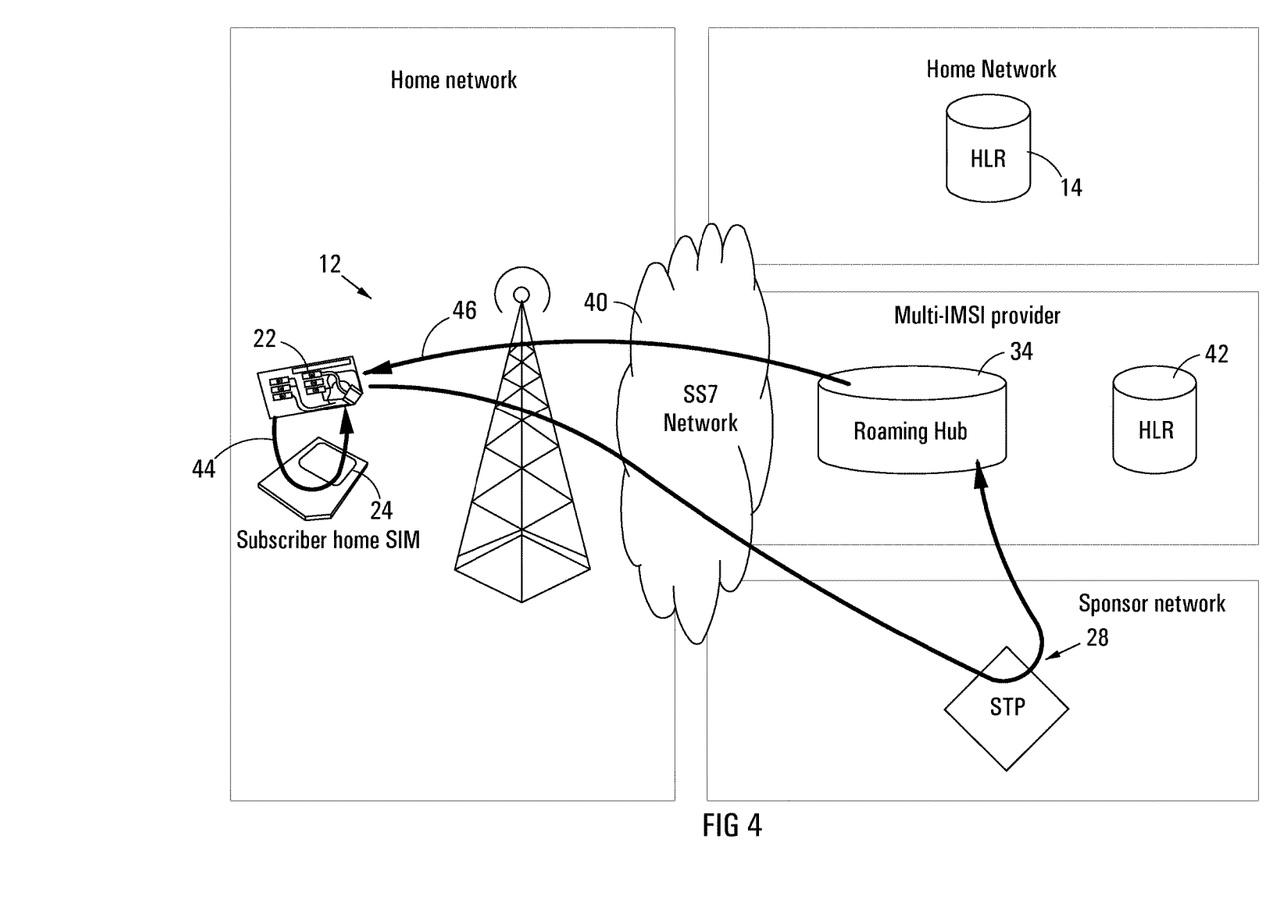
FIG. 4 shows a high level architectural layout and typical signal flow in accordance with a second part of an activation mode.

Turning now to FIGS. 3 and 4 in particular, the method comprises an activation process (i.e. activation mode), which takes place when the overlay 22 is first installed onto the SIM card 24, and the mobile device is powered up.

In a first part of the activation process, shown in the FIG. 3, the method comprises presenting the primary sponsor IMSI to an available mobile network 40 with which the operator of the sponsor network 28 has an established roaming agreement in place. In response to an authentication request from the available mobile network 40, the overlay retrieves and uses the temporary activation Ki stored on the overlay.

In an embodiment, the step of presenting the primary sponsor IMSI to an available mobile network 40 comprises the step of the overlay 22 presenting the primary ("pilot") sponsor IMSI to the baseband processor of the mobile device, which in turn can then present the primary sponsor IMSI to the available mobile network 40.

An authentication request, which now includes the temporary activation Ki, is then compiled and forwarded to the sponsor network 28, for onward transmission to the multi-IMSI roaming hub platform 34.

In an embodiment, the roaming hub 34 recognizes that the overlay 22 is in an activation process (i.e. in an activation mode), and forwards the received authentication request to an HLR 42 associated with the multi-IMSI roaming hub platform 34.

In an embodiment, the HLR 42 associated with the multi-IMSI roaming hub platform 34 knows the temporary activation Ki assigned to the subscriber, with the method further comprising generating authentication data and routing the authentication data back to the sponsor network 28. Authentication is then successfully completed, and a successful location update (LU) is then also successfully completed.

Turning now to FIG. 4, as soon as the LU procedure has been completed, and the mobile device is connected to the sponsor network 28, the activation process comprises the overlay reading the IMSI on the underlying SIM card 24, as indicated by arrow 44, and originating a command towards the multi-IMSI roaming hub platform 34 to report this IMSI. The multi-IMSI roaming hub platform 34 then pairs the primary sponsor IMSI with the IMSI on the underlying original SIM card 24, without further user intervention. Upon completion, the roaming hub platform 34 sends a command, as indicated by line 46, towards the overlay 22, which completes the seamless activation procedure and resets the mobile device.

Figure 5:
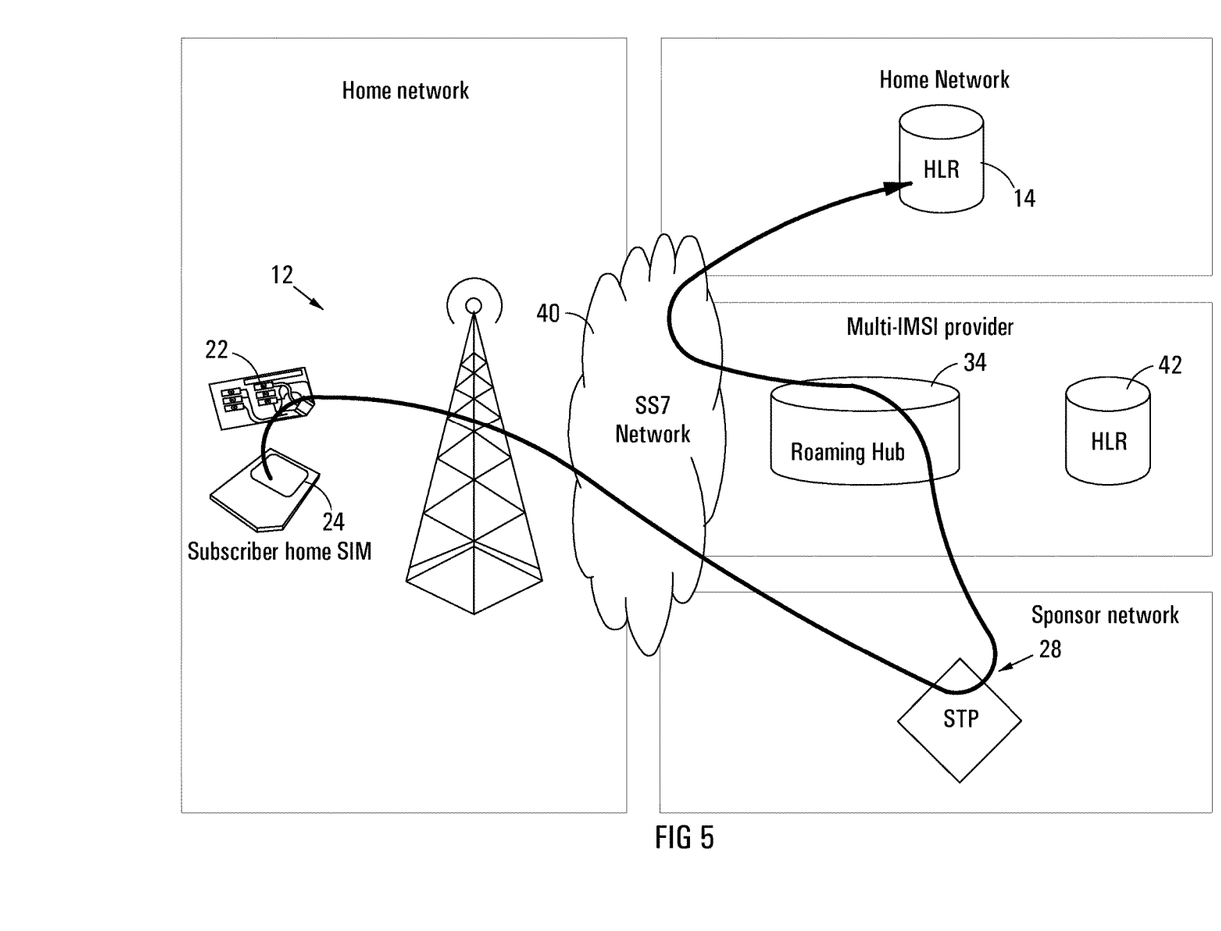
FIG. 5 shows a high level architectural layout and typical signal flow in accordance with a first part of a running mode.
Figure 6:
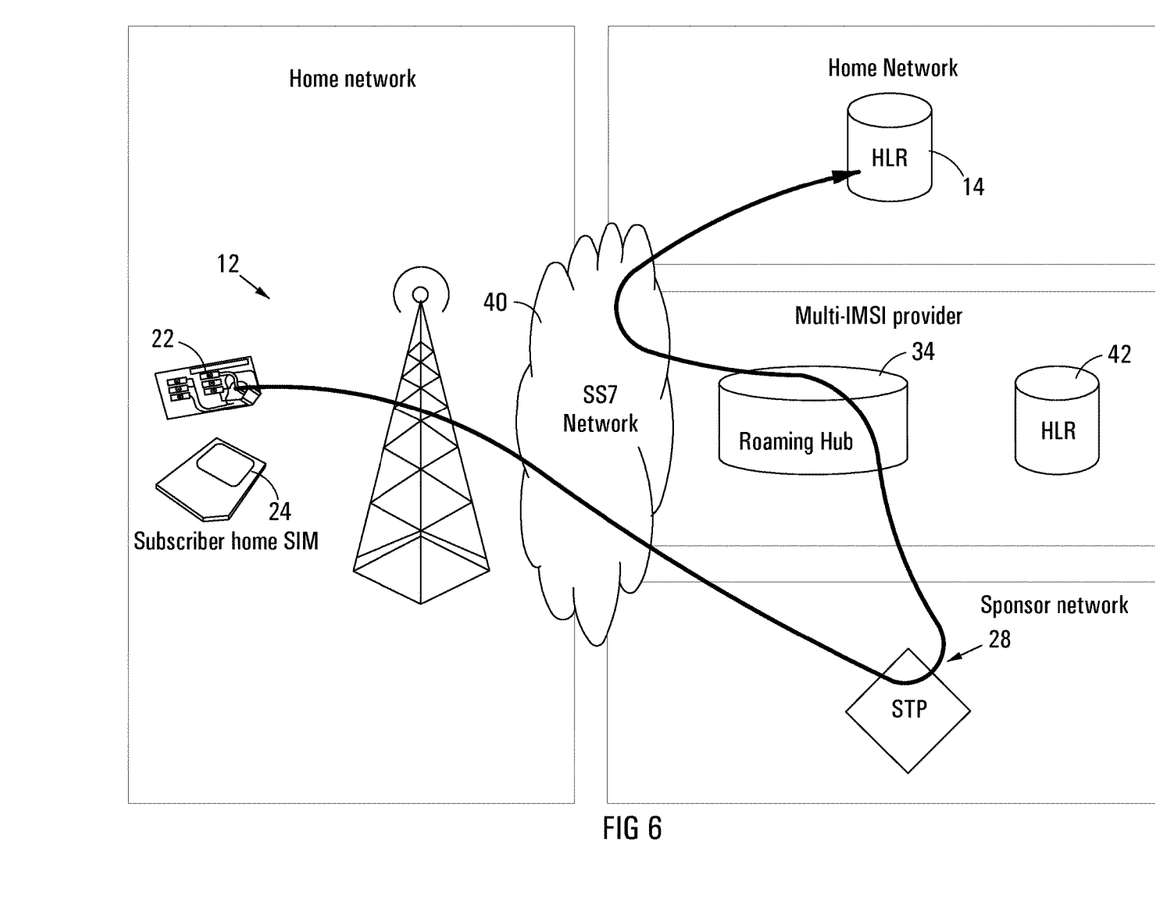
FIG. 6 shows a high level architectural layout and typical signal flow in accordance with a second part of a running mode.

Turning now to FIGS. 5 and 6 in particular, the method comprises a running process (i.e. running mode), which varies depending on whether the mobile device is in its home country/network (FIG. 5) or in a foreign country/network (FIG. 6).

When in its home country/network, the overlay 22 acts transparently, and thus simply exposes the IMSI contained on the SIM to the mobile device, as indicated by line 48. The signal flow would then be from the home IMSI on the SIM card 24, through the overlay 22, through an intermediate mobile network 40, through the sponsor network 28, back to an intermediate mobile network 40 via the roaming hub platform 34 to access the HLR 14 of the home network.

When the mobile device leaves its home country/network, the overlay 22 automatically takes over, and the primary sponsor IMSI is exposed to the mobile device instead of the original IMSI. In this case, the LU is run against the overlay 22. The primary IMSI communicates with both the multi-IMSI roaming hub platform 34 and core nodes within the home network (i.e. the HLR 14 of the home network).

Under these circumstances, the running process comprises the roaming hub platform 34 provisioning additional IMSIs onto the overlay 22 via over the air (OTA), as needed, to ensure that the most economical sponsor IMSI is being used in the country being visited by the mobile device.

In both cases, because of the involvement of the HLR 14 of the home network, the end user receives their normal services, is reachable under their normal MSISDN, and all services are controlled from the home network's core equipment.

The invention claimed is:
1. A method of providing a multi-International Mobile Subscriber Identity (multi-IMSI) solution for a subscriber having a mobile device in an operating mobile network, the mobile device being fitted with a Subscriber Identification Module (SIM) card having an IMSI and a baseband component, the mobile device comprising a corresponding baseband processor to enable the SIM card to communicate with a home network, run by a home network operator, related to the IMSI via the baseband processor, the method comprising:

fitting a SIM card overlay to the SIM card, the overlay acting as a proxy between the SIM card and the mobile device's baseband processor, the overlay comprising a primary ("pilot") sponsor IMSI that is related to a sponsor network, run by a sponsor network operator, with a temporary activation authentication key (Ki);

determining when the mobile device has roamed out of the home network and into a foreign network having an agreement with a sponsor network associated with the sponsor IMSI;

generating signaling messages, with the sponsor IMSI generating these messages, and sending these to a multi-IMSI roaming hub platform, the roaming hub platform being connected to each sponsor network;

translating these messages in real time and relaying them to the home network of the home network operator, so that to the home network it looks as if the IMSI of the home network operator is still roaming in the home network; and running an activation process, which takes place when the overlay is first installed onto the SIM card, and the mobile device is powered up, the activation process comprising:

presenting the primary sponsor IMSI to an available mobile network with which the sponsor network operator has an established roaming agreement in place;

in response to an authentication request from the available mobile network, using the temporary activation Ki stored on the overlay; and forwarding an authentication request, which now includes the temporary activation Ki, to the sponsor network, for onward transmission to the multi-IMSI roaming hub platform.

2. The method of claim 1, wherein the overlay may comprise at least one secondary sponsor IMSI.

3. The method of claim 1, wherein the step of presenting the primary sponsor IMSI to an available mobile network comprises the step of the overlay presenting the primary sponsor IMSI to the baseband processor of the mobile device, which in turn can then present the primary sponsor IMSI to an available mobile network.

4. The method of claim 3, wherein the roaming hub recognizes that the overlay is in an activation process, and forwards the received authentication request to an Home Location Register (HLR) associated with the multi-IMSI roaming hub platform.

5. The method of claim 4, wherein the HLR associated with the multi-IMSI roaming hub platform knows the temporary activation Ki assigned to the subscriber, with the method further comprising generating authentication data and routing the authentication data back to the sponsor network.

6. The method of claim 5, wherein the activation process comprises reading the IMSI on the underlying SIM card, and originating a command towards the multi-IMSI roaming hub platform to report this IMSI.

7. The method of claim 6, wherein the multi-IMSI roaming hub platform then pairs the primary sponsor IMSI with the IMSI on the underlying original SIM card.

8. The method of claim 1, wherein the method comprises a running process, depending on whether the mobile device is in its home country/network or in a foreign country/network.

9. The method of claim 8, wherein when in its home country/network, the overlay acts transparently, and thus exposes the IMSI contained on the SIM to the mobile device.

10. The method of claim 8, wherein when the mobile device leaves its home country/network, the overlay automatically takes over, and the primary sponsor IMSI is exposed to the mobile device instead of the original IMSI.

11. A system for providing a multi-International Mobile Subscriber Identity (multi-IMSI) solution for a subscriber having a mobile device in an operating mobile network, the mobile device being fitted with a Subscriber Identification Module (SIM) card having an IMSI and a baseband component, the mobile device comprising a corresponding baseband processor to enable the SIM card to communicate with a home network, run by a home network operator, related to the IMSI via the baseband processor, the system comprising:

a SIM card overlay that can be fitted to the SIM card, the overlay acting as a proxy between the SIM card and the mobile device's baseband processor, the overlay comprising a primary sponsor IMSI that is each related to a sponsor network, run by a sponsor network operator, with a temporary activation authentication key (Ki);

means for determining when the mobile device has roamed out of the home network and into a sponsor network associated with the sponsor IMSI;

means for generating and sending signaling messages; and a multi-IMSI roaming hub platform for receiving the signaling messages, the roaming hub platform being connected to each sponsor network, the multi-IMSI roaming hub platform comprising a processor that is arranged to translate these messages in real time and relaying them to the home network of the home network operator, so that to the home network it looks as if the IMSI of the home network operator is still roaming in the home network, wherein the roaming hub platform can recognize when the overlay is in an activation mode, and in this mode the roaming hub platform is arranged to forward a received authentication request to a Home Location Register (HLR) associated with the multi-IMSI roaming hub platform, wherein the HLR associated with the multi-IMSI roaming hub platform, which knows the temporary activation Ki assigned to the subscriber, generates authentication data and routes the authentication data back to the sponsor network.

12. The system of claim 11, wherein, in the activation mode, the overlay reads the IMSI on the underlying SIM card, and originates a command towards the multi-IMSI roaming hub platform to report this IMSI.

13. The system of claim 12, wherein the multi-IMSI roaming hub platform is arranged to pair the primary sponsor IMSI with the IMSI on the underlying original SIM card.

14. The system of claim 13, wherein the roaming hub platform can recognize when the overlay is in a running mode, and in this mode, and when the mobile device is in a foreign country/network, the processor of the roaming hub platform is arranged to provision additional IMSIs onto the overlay via over the air (OTA), as needed, to ensure that the most economical sponsor IMSI is being used in the country being visited by the mobile device.

15. The system of claim 11, wherein the overlay may comprise at least one secondary sponsor IMSI.

16. The system of claim 11, wherein the overlay comprises a running mode, which varies depending on whether the mobile device is in its home country/network or in a foreign country/network.

* * * * *